US010885899B2

(12) United States Patent
Iyer et al.

(10) Patent No.: US 10,885,899 B2
(45) Date of Patent: Jan. 5, 2021

(54) RETRAINING VOICE MODEL FOR TRIGGER PHRASE USING TRAINING DATA COLLECTED DURING USAGE

(71) Applicant: Motorola Mobility LLC, Chicago, IL (US)

(72) Inventors: Boby Iyer, Elmhurst, IL (US); Amit Kumar Agrawal, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 149 days.

(21) Appl. No.: 16/155,275

(22) Filed: Oct. 9, 2018

(65) Prior Publication Data

US 2020/0111478 A1    Apr. 9, 2020

(51) Int. Cl.
*G10L 15/06*  (2013.01)
*G10L 15/22*  (2006.01)

(52) U.S. Cl.
CPC ............ *G10L 15/063* (2013.01); *G10L 15/22* (2013.01); *G10L 2015/223* (2013.01); *G10L 2015/225* (2013.01)

(58) Field of Classification Search
CPC ....... G10L 15/063; G10L 15/00; G10L 15/01; G10L 15/06; G10L 15/065; G10L 15/14; G10L 15/144; G10L 15/183; G10L 15/20; G10L 15/26; G10L 2015/063; G10L 2015/06; G10L 2015/2631; G10L 2015/0635; G10L 2015/0636; G10L 2015/0638; G10L 2015/22; G10L 2015/225

USPC .... 704/243, 244, 231, 250, 251, 255, 270.1, 704/270
See application file for complete search history.

(56) References Cited

U.S. PATENT DOCUMENTS

| 7,089,183 B2* | 8/2006 | Gong ................... G10L 15/07 704/244 |
| 9,697,822 B1* | 7/2017 | Naik .................... G10L 15/063 |
| 2010/0179812 A1* | 7/2010 | Jang ..................... G10L 15/065 704/244 |
| 2014/0207716 A1* | 7/2014 | Hsu ........................ G06N 20/00 706/12 |
| 2014/0278435 A1* | 9/2014 | Ganong, III ........... G10L 15/22 704/275 |

* cited by examiner

*Primary Examiner* — Qi Han

(57) ABSTRACT

A method includes receiving initial training data associated with a trigger phrase in a device and training a voice model in the device using the initial training data. The voice model is used to identify a plurality of voice commands in the device initiated using the trigger phrase. Collection of additional training data from the plurality of voice commands and retraining of the voice model in the device are iteratively performed using the additional training data. A device includes a microphone and a processor to receive initial training data associated with a trigger phrase using the microphone, train a voice model device using the initial training data, use the voice model to identify a plurality of voice commands initiated using the trigger phrase, and iteratively collect additional training data from the plurality of voice commands and retrain the voice model in the device using the additional training data.

20 Claims, 2 Drawing Sheets

RETRAINING VOICE MODEL FOR TRIGGER PHRASE USING TRAINING DATA COLLECTED DURING USAGE

BACKGROUND

Field of the Disclosure

The disclosed subject matter relates generally to computing systems and, more particularly, to retraining a voice model for a trigger phrase using training data collected during usage of the voice model.

Description of the Related Art

Many devices, such as mobile devices, allow user interaction through natural language voice commands. Typically, a user presses a button or speaks a "trigger" phrase to enable the voice communication. Often, the user desires to employ voice commands to operate in a hands-free mode, such as while driving. Generally, an initial training process, or enrollment, is conducted with the user to collect training data for a trigger phrase, such as "Hello Moto". While users only need to speak the trigger phrase 3-4 times to finish the enrollment, the enrollment process places many restrictions in terms of noise conditions. In general, the restrictions relate to noise conditions (e.g., background noise, other voices, equipment noise, echo), device placement/orientation (e.g., on a tabletop), etc. Due to these restrictions, users sometimes terminate the enrollment without completing the training of the trigger phrase.

One particular reason for enrollment termination has been determined to be the user being notified that there is too much noise in the room. If the user is in an environment with too much noise when the enrollment is attempted, it is not always the case that the user will return to the enrollment process when in a better noise environment. Restricting the user during the first instance of enrollment may result in lack of interest later.

Even in cases where a user successfully completes the enrollment, there may be a high number of false acceptances or false rejections of the trigger phrase, which may lead the user to disable the always on trigger phrase.

The present disclosure is directed to various methods and devices that may solve or at least reduce some of the problems identified above.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF EMBODIMENT(S)

Figure 1:
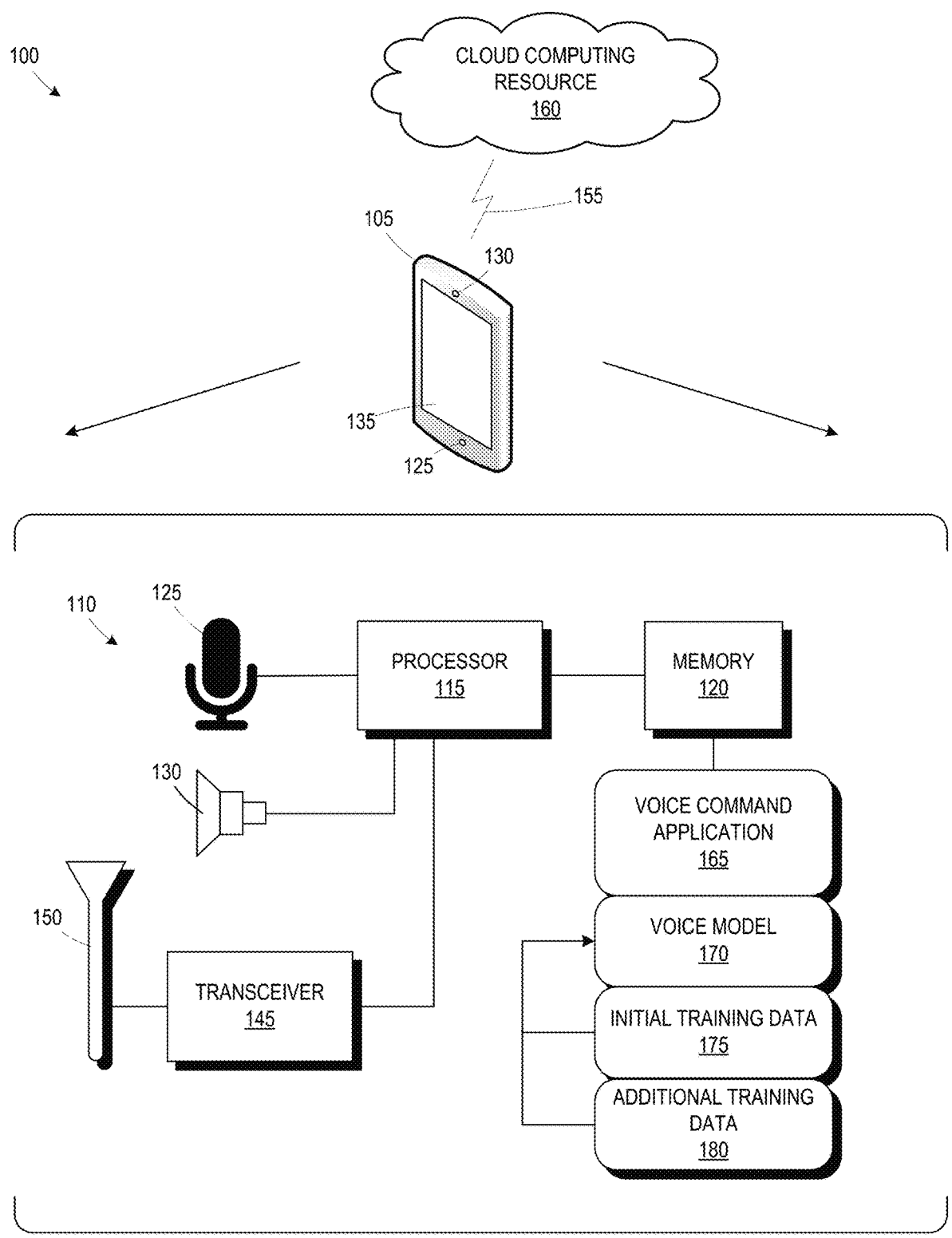
FIG. 1 is a simplified block diagram of a communication system for retraining a voice model for a trigger phrase using training data collected during usage of the voice model, according to some embodiments disclosed herein.
Figure 2:
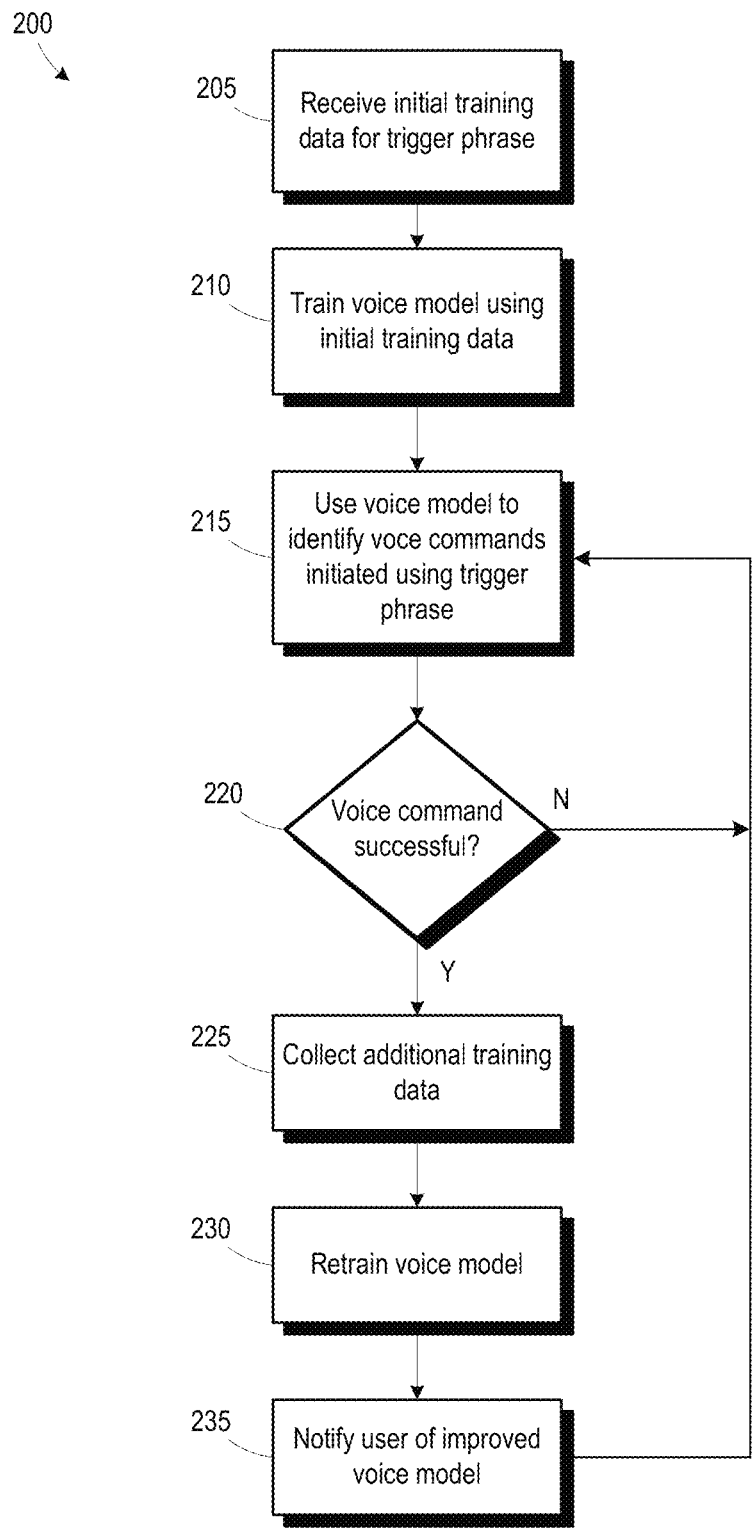
FIG. 2 is a flow diagram of a method for retraining a voice model for a trigger phrase using training data collected during usage of the voice model, according to some embodiments disclosed herein.

FIGS. 1-2 illustrate example techniques for retraining a voice model for a trigger phrase using training data collected during usage of the voice model in a device. A user voice interaction with a device typically includes the use of a trigger phrase to signal the device that a subsequent command phrase will be provided by the user. In response to the trigger phrase, e.g., "Hello Moto", the device listens for and parses a subsequently voiced command phrase, such as "what is the weather in Chicago?", "what is the score of the Cub's game?", "get directions to home", etc. The device executes actions associated with the command phrase to look up information, interface with an app on the device, etc. The voice model is trained using initial training data collected during an enrollment process. The initial training data may be collected under non-optimal noise conditions. Additional training data is collected for user voice commands identified using the voice model. The voice model is retrained dynamically as additional training data becomes available to increase the efficacy of the voice model over time. Due to the iterative training of the voice model, the restrictions on the enrollment process for collecting the initial training data may be relaxed.

FIG. 1 is a simplistic block diagram of a communications system 100 for retraining a voice model for a trigger phrase using training data collected during usage of the voice model in a device 105. The device 105 implements a computing system 110 including, among other things, a processor 115, a memory 120, a microphone 125, a speaker 130, and a display 135. The processor 115 may be implemented using a plurality of processors, each having responsibility for certain tasks in the device 105. The memory 120 may be a volatile memory (e.g., DRAM, SRAM) or a non-volatile memory (e.g., ROM, flash memory, hard disk, etc.), or a combination of both volatile and non-volatile memory. In some embodiments, the memory 120 may be integrated into the processor 115, or the memory 120 may include a combination of internal memory and external memory.

The device 105 includes a transceiver 145 for transmitting and receiving signals via an antenna 150 over a communication link 155. The transceiver 145 may include one or more radios for communicating according to different radio access technologies, such as cellular, Wi-Fi, Bluetooth®, etc. The communication link 155 may have a variety of forms. In some embodiments, the communication link 155 may be a wireless radio or cellular radio link. The communication link 155 may also communicate over a packet-based communication network, such as the Internet. In one embodiment, a cloud computing resource 160 may interface with the device 105 to implement one or more of the functions described herein.

In various embodiments, the device 105 may be embodied in a handheld or wearable device, such as a laptop computer, a handheld computer, a tablet computer, a mobile device, a telephone, a personal data assistant, a music player, a game device, a wearable computing device, and the like. To the extent certain example aspects of the device 105 are not described herein, such example aspects may or may not be included in various embodiments without limiting the spirit and scope of the embodiments of the present application as would be understood by one of skill in the art.

In the device 105, the processor 115 may execute instructions stored in the memory 120 and store information in the memory 120, such as the results of the executed instructions. Some embodiments of the processor 115, the memory 120 and the microphone 125 may be configured to implement a voice command application 165 and perform portions of a method 200 shown in FIG. 2 and discussed below. The voice command application 165 may employ a voice model 170 used to identify user utterances of a trigger phrase and a subsequent voice command. During an enrollment process, initial training data 175 may be collected and used to train the voice model 170. The voice command application 165 may execute the collect additional training data 180 during usage of the voice model 170 to process voice commands using the trigger phrase to allow retraining of the voice model 170. One or more aspects of the method 200 may also be implemented using the cloud computing resource 160 in addition to the voice command application 165.

In some embodiments, the voice command application 165 may be a firmware application stored in a non-volatile portion of the memory 120. The voice model 170 and training data 175, 180 may also be stored in the non-volatile portion of the memory 120 to allow the processor 115 to efficiently identify trigger phrases from data received over the microphone 125.

FIG. 2 is a flow diagram of an illustrative method 200 for retraining a voice model 170 for a trigger phrase using training data collected during usage of the voice model 170, in accordance with some embodiments disclosed herein. In one example, various elements of the method 200 shown in FIG. 2 may be implemented on the device 105. In some embodiments, the cloud computing resource 160 (see FIG. 1) may also be used to perform one or more elements of the method 200. For example, a voice command that requires the device 105 to retrieve external data may be passed to the cloud computing resource 160, and the cloud computing resource 160 may gather and return the requested data to the device 105.

In method block 205, initial training data associated with a trigger phrase is received in the device 105. The voice command application 165 may initiate an enrollment to collect the initial training data. The voice command application 165 may invoke the enrollment when the device 105 is first set up, or the user may initiate the enrollment based on a menu selection or in response to a prompt from the voice command application 165 indicating that voice commands have not yet been enabled. Due to the iterative training of the voice model 170 described herein, the restrictions on the enrollment process for collecting the initial training data may be relaxed.

In method block 210, the voice model 170 is trained using the initial training data. Techniques for training a voice model are known in the art, so they are not described in greater detail herein to avoid obscuring the present subject matter.

In method block 215, the voice model 170 is used to identify voice commands initiated using the trigger phrase. The voice command generally specifies a command for the device 105 to implement, such as the gathering of data, the execution of an application, the changing of a setting on the device 105, the initiation of a call, the initiation of a text message, etc.

In method block 220, the voice command application 165 determines if the voice command was successfully executed. Successful completion generally means that the user consumed the information or participated in the command action resulting from the voice command. For example, if the voice command retrieved data, the successful completion of the voice command may be identified responsive to the user interacting with the display 135 to view and/or interact with the data. If the voice command launched an application, the voice command application 165 may determine if the user interacted with the application. On the converse side, if the voice command initiated a phone call, and the user immediately terminated the call, the termination is an indication of a voice command error. The voice command application 165 attempts to distinguish between successful and errant voice commands to identify instances where the trigger phrase was correctly identified using the voice model 170. Voice commands that do not include a measure of user consumption may be treated as unsuccessful voice commands for purposes of collecting additional training data. The voice command application 165 returns to method block 215 for unsuccessful voice commands.

In method block 225, the voice command application 165 collects additional training data from the successful voice commands. Unsuccessful voice commands, or voice commands that did not involve subsequent user interaction with the device 105 to facilitate verification, are not used to collect additional training data.

In method block 230, the voice model 170 is retrained using the additional training data 180, thereby improving the efficacy of the voice model 170. The voice data in the training data 175, 180 may be ranked using metrics, such as a noise metric, an echo metric, an automated speech recognition metric, a speaker verification metric, or a combination of multiple metrics.

A combined quality metric may be generated from the individual voice samples in the training data 175, 180. If the combined quality metric surpasses a particular threshold, the user may be notified of the improved voice model 170 in method block 235 (e.g., by voicing a message or displaying a message on the display 135). In some embodiments, fixed quality metric thresholds may be employed. In other embodiments, each time the combined quality metric improves by a particular amount, such as 5%, the user may be notified. Notifying the user of the improved voice model 170 quality serves to encourage usage of the voice command features.

The method 200 returns to method block 215 to continue iterating the collection of the additional training data 180 and the retraining of the voice model 170. Although the initial training data 175 and the additional training data 180 are illustrated as being separate data sets, in an actual implementation, there is a single set of training data with different voice sample entries. Each entry in the training data 175, 180 may be ranked using a quality metric. Over time, the voice samples in the initial training data 175 may be replaced with voice samples from the additional training data 180, and the quality metrics associated with the voice samples in the combined set of training data 175, 180 may increase. The voice model 170 is thus retrained dynamically as additional training data 180 becomes available to increase the efficacy of the voice model 170 over time. The iterative collection of training data 180 and the retraining of the voice model 170 may be terminated when all samples have quality metrics greater than a predetermined threshold.

Dynamically improving the voice model 170 by collecting additional training data 180 and retraining the voice model 170 simplifies the configuration of the device 105 and improves the user experience. The retraining of the voice model 170 may be conducted without specific user intervention.

In some embodiments, certain aspects of the techniques described above may be implemented by one or more processors of a processing system executing software. The method 200 described herein may be implemented by executing software on a computing device, such as the processor 115 of FIG. 1, however, such methods are not abstract in that they improve the operation of the device 105 and the user's experience when operating the device 105. Prior to execution, the software instructions may be transferred from a non-transitory computer readable storage medium to a memory, such as the memory 120 of FIG. 1.

The software may include one or more sets of executable instructions stored or otherwise tangibly embodied on a non-transitory computer readable storage medium. The software can include the instructions and certain data that can, when executed by one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

A method includes receiving initial training data associated with a trigger phrase in a device and training a voice model in the device using the initial training data. The voice model is used to identify a plurality of voice commands in the device initiated using the trigger phrase. Collection of additional training data from the plurality of voice commands and retraining of the voice model in the device are iteratively performed using the additional training data.

A method includes receiving initial training data associated with a trigger phrase in a device and training a voice model in the device using the initial training data. The voice model is used to identify a plurality of voice commands in the device initiated using the trigger phrase. Additional training data is collected from the plurality of voice commands in the device. The voice model is retrained in the device using the additional training data. Subsequent voice commands are identified in the device using the retrained voice model.

A device includes a microphone and a processor to receive initial training data associated with a trigger phrase using the microphone, train a voice model device using the initial training data, use the voice model to identify a plurality of voice commands received using the microphone and initiated using the trigger phrase, and iteratively collect additional training data from the plurality of voice commands and retrain the voice model in the device using the additional training data.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

What is claimed is:

1. A method, comprising:
    receiving initial training data associated with a trigger phrase in a device;
    training a voice model in the device using the initial training data;
    using the voice model to identify a plurality of voice commands in the device initiated using the trigger phrase;
    iteratively collecting additional training data from the plurality of voice commands and retraining the voice model in the device using the additional training data; and
    generating a user notification message on the device responsive to retraining the voice model.

2. The method of claim 1, further comprising generating the user notification on the device responsive to the retrained model having a quality metric greater than a first threshold.

3. The method of claim 1, further comprising generating the user notification on the device responsive to a quality metric associated with the retrained model increasing by a predetermined value.

4. The method of claim 3, wherein the quality metric is generated using one of a noise metric, an echo metric, an automated speech recognition metric, or a speaker verification metric.

5. The method of claim 1, wherein collecting the additional training data comprises collecting the additional training data for selected voice commands for which user input was received in the device subsequent to executing the selected voice command in the device.

6. The method of claim 1, wherein collecting the additional training data comprises collecting the additional training data for selected voice commands successfully executed in the device.

7. The method of claim 1, further comprising terminating the iterative collecting of additional training data and the retraining of the voice model responsive to a quality threshold associated with the additional training data exceeding a predetermined threshold.

8. A method, comprising:
    receiving initial training data associated with a trigger phrase in a device;
    training a voice model in the device using the initial training data;
    using the voice model to identify a plurality of voice commands in the device initiated using the trigger phrase;
    collecting additional training data from the plurality of voice commands in the device;

retraining the voice model in the device using the additional training data;
generating a user notification message on the device responsive to retraining the voice model; and
identifying subsequent voice commands in the device using the retrained voice model.

9. The method of claim 8, further comprising generating the user notification on the device responsive to the retrained model having a quality metric greater than a first threshold.

10. The method of claim 8, further comprising iterating the collecting and retraining in the device using the subsequent voice commands to further retrain the model.

11. The method of claim 10, further comprising generating the user notification on the device responsive to a quality metric associated with the further retrained model increasing by a predetermined value.

12. The method of claim 8, wherein collecting the additional training data comprises collecting the additional training data for selected voice commands for which user input was received in the device subsequent to executing the selected voice command in the device.

13. The method of claim 8, wherein collecting the additional training data comprises collecting the additional training data for selected voice commands successfully executed in the device.

14. A device, comprising:
a microphone; and
a processor to receive initial training data associated with a trigger phrase using the microphone, train a voice model device using the initial training data, use the voice model to identify a plurality of voice commands received using the microphone and initiated using the trigger phrase, iteratively collect additional training data from the plurality of voice commands, retrain the voice model in the device using the additional training data, and generate a user notification message on the device responsive to retraining the voice model.

15. The device of claim 14, wherein the processor is to generate the user notification on the device responsive to the retrained model having a quality metric greater than a first threshold.

16. The device of claim 14, wherein the processor is to generate the user notification on the device responsive to a quality metric associated with the retrained model increasing by a predetermined value.

17. The device of claim 16, wherein the quality metric is generated using one of a noise metric, an echo metric, an automated speech recognition metric, or a speaker verification metric.

18. The device of claim 14, wherein the processor is to collect the additional training data by collecting the additional training data for selected voice commands for which user input was received in the device subsequent to executing the selected voice command in the device.

19. The device of claim 14, wherein the processor is to collect the additional training data by collecting the additional training data for selected voice commands successfully executed in the device.

20. The device of claim 14, wherein the processor is to terminate the iterative collecting of additional training data and the retraining of the voice model responsive to a quality threshold associated with the additional training data exceeding a predetermined threshold.

* * * * *